United States Patent

Blank (12)

(10) Patent No.: US 6,230,432 B1
(45) Date of Patent: May 15, 2001

(54) ENHANCED FISHING LINE FLOW MECHANISM

(76) Inventor: Arthur Blank, 19 Woodview Dr., Doylestown, PA (US) 18901

( * ) Notice: Subject to any disclaimer, the term of this patent is extended or adjusted under 35 U.S.C. 154(b) by 0 days.

(21) Appl. No.: 09/398,514

(22) Filed: Sep. 17, 1999

(51) Int. Cl.⁷ .................................................. A01K 87/04
(52) U.S. Cl. ........................................................ 43/24
(58) Field of Search .................................. 43/18.1, 18.5, 43/24

(56) References Cited

U.S. PATENT DOCUMENTS

| | | |
|---|---|---|
| 343,802 | 6/1886 | Everett ........................ 43/24 |
| 670,961 | 4/1901 | Lenharth . |
| 1,231,150 | 6/1917 | Gere . |
| 1,444,063 | 2/1923 | Davis . |
| 2,227,868 | 1/1941 | Tengel . |
| 2,776,516 | 1/1957 | Jennette ...................... 43/24 |
| 2,781,602 | 2/1957 | Warford . |
| 2,895,251 | 7/1959 | Karry . |
| 3,222,811 | 12/1965 | Henson ....................... 43/24 |
| 3,279,116 | 10/1966 | Chapman ................... 43/24 |
| 3,417,500 | 12/1968 | Carabasse ................ 43/18.1 |
| 4,011,680 | 3/1977 | Rienzo, Sr. ................. 43/24 |
| 4,174,583 | 11/1979 | Ohmura ...................... 43/24 |
| 5,401,345 | 3/1995 | Park ............................ 43/24 |

FOREIGN PATENT DOCUMENTS 4117232   4/1992   (JP) ...................................... 43/18.1

*Primary Examiner*—Kurt Rowan

(57) ABSTRACT

A line guide for a fishing rod which consists of a specific trumpet-shaped tubular guide ring having an interior surface consisting entirely of a polished ceramic or hardened metal such as aluminum oxide or chrome stainless steel, respectively. The guide ring is trumpet-shaped and/or conically-shaped and mounted to a standard support for attachment to a fishing rod.

1 Claim, 1 Drawing Sheet

ENHANCED FISHING LINE FLOW MECHANISM

BACKGROUND

1. Field of Invention

The present invention relates to a line guide attachable either to a fishing rod. More particularly, it relates to a funnel-like or trumpet-like guide of specific critical dimensions functioning as interior of the guide ring of such line guide.

2. Background

The novel invention is intended to address an angler's increased casting capabilities with substantially more distance and accuracy.

Line guides of the type above referred to serve to guide the fishing line along the fishing rod in a unique fashion so that a terminal tackle (bait or lure) can be casted with substantially increased distance and accuracy. The fishing line is generally in contact with the inner surface of the guide ring of line guides. At times, this contact is a pressure contact, i.e., when a hooked fish is being fought and retrieved. The guide for the line is further adapted such that the line can be let out and reeled in without becoming entangled with the rod itself or otherwise. Specifically, the fishing line is in contact with at least a point within the inner surface of the guide ring of line guides. This contact may be a pressure contact, for instance, when a heavy sinker is attached to the hook carrying end of the line or a caught fish is played. The passage speed of the line through the guide ring of a line may be slow, for instance, when the fisherman just lets out the line until the bait reaches bottom or very fast when the fisherman is casting or plays a caught fish.

As it is evident from the afore-listed conditions under which a fishing line functions, the friction between the line and the running surface of the line guides is a significant factor largely controlling the useful lifetime of the line and in particular its resistance to failing or otherwise snapping under strain. The friction factor is particularly important as the smoothness of the line surface ring may be compromised by natural elements, for example, salt water, sand, dirt, sunlight, etc. and/or restricted by sand, various substances, or dirt particles adhering to the line. Failure of the line while in use is not only annoying to the fisherman, but may also be quite costly.

Various attempts have been made to reduce the friction between the line and the ring of a line guide to a minimum, both as to the shape of the guide ring and the material used for its running surface. There are known line guides of rectangular configuration to provide a relatively large and flat running surface to avoid the formation of grooves in the inner ring surface as may occur when the line is confined to narrow running surfaces but line guides so shaped have relatively sharp edges even if these edges are rounded and friction is substantially increased when the line, due to the pull direction, contacts an edge under pressure. Most line guides as now used have a circular, or at least substantially circular configuration. Such line guides have neither flat running surfaces nor edges.

Various attempts have also been made to provide material for the rings of line guides which has a low friction factor, is sufficiently hard to avoid or at least reduce the formation of scratches and grooves by abrasive particles carried by the line and is not sensitive to corrosion by salt water. For instance, several types of alumina have been used for guide rings.

In 1977 Rienzo, Sr. received U.S. Pat. No. 4,011,680 for a line guide for a fishing line comprising a generally ring-shaped guide member made of a material consisting of titanium and ceramic as a binder, a matchingly shaped band of hard metal encompassing said guide member with a tight fit, and a mounting means fixedly secured to said metal band for fastening the guide member and the band to a fishing rod. The Rienzo guide member is a ring made of titanium dioxide and may include an admixture of carbon. Then, in 1979 Ohmura received U.S. Pat. No. 4,174,583 for a line guide ring made of a ceramic suspensorily upheld within a fixing ring similar to that of Rienzo but made of an elastic metallic material such as stainless steel while leaving a plurality of separate gaps between the two rings which function as a shock absorber but omitting the conventionally use intermediate cushion ring to minimize the entire size and weight of the line guide assembly.

BRIEF DESCRIPTION OF THE DRAWING

Various objects, features and alternate advantages of the invention will be more fully appreciated as the same becomes better understood with reference to the following detailed description of the present invention when considered in connection with the accompanying drawings, in which.

DETAILED DESCRIPTION

Figure 1:
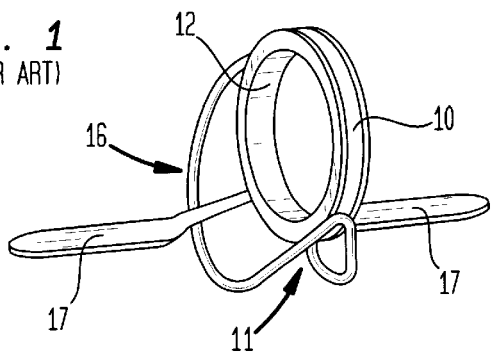
FIG. 1 is a perspective view of a prior art line guide according to the prior art.

Referring in detail to the drawing figures and first to FIG. 1, a prior art line guide 16 as shown comprises a guide ring 10 and a cradle 11 for supporting the guide ring. The prior art guide ring is composed of an inner ring 12 essentially consisting of titanium and, preferably, of titanium dioxide with ceramic as a binder. To increase the smoothness of the running surface prior art devices such as the one shown have carbon admixed to the ceramic material forming ring 12. Such admixture has a lubricating effect and also hardens the ring material. Ring 12 is shown as having a substantially rectangular cross-section with rounded edges, but it may also have a more curved configuration on its inwardly facing surface to reduce friction between the fishing line, which is usually made of a plastic such as nylon, and the surface of the ring. In the prior art it is suggested that is acceptable to give ring 12 an oval configuration rather than the illustrated circular configuration and the prior art does not recognize any degradation in performance using the optional oval aperture suggested. The inventor discovery includes recognition that the use of an oval aperture actual degrades performance of a guide and results in less distance and less accuracy in casting.

In FIG. 1 the inner ring 12 is secured and mounted within the surrounding guide ring 10 into which it is tightly fitted. The encirclement for the inner ring 12 of the prior art formed by the ring 10, as for the novel improvement described herein, is made of suitable metal such as hard aluminum or stainless steel. The guide ring 10 is secured to a cradle 16. This cradle has two legs 17 by means of which the entire assembly can be conveniently secured to a fishing rod generally by tightly winding thread about the rod proper and legs 17.

Figure 2:
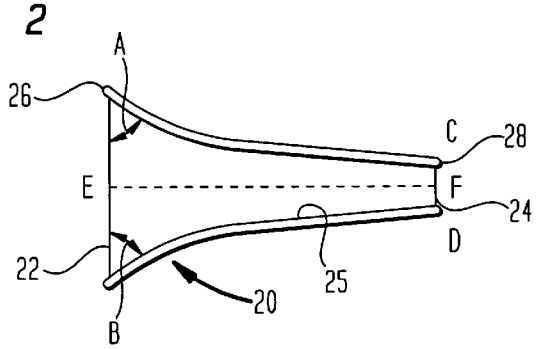
FIG. 2 is a cross section taken on line 2–2' of FIG. 3 of the novel line guide according to the invention wherein two rings with feet extending beyond each end of the line guide are shown saddled to the guide and adapted for mounting on a rod.
Figure 3:
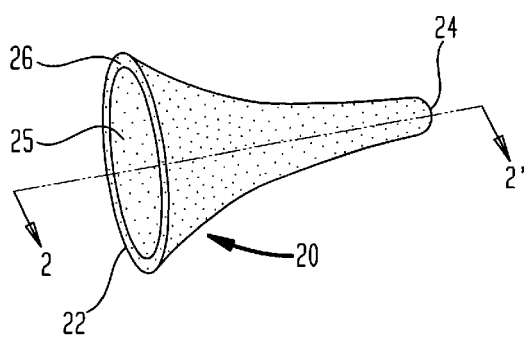
FIG. 3 is a perspective view of the line guide made in accordance with the specifications for the novel invention; and, FIG. 4 is a perspective view of the novel line guide inserted in a frame and fixedly attached to the frame, the frame adapted to be attached to a fishing rod (not shown).
Figure 4:
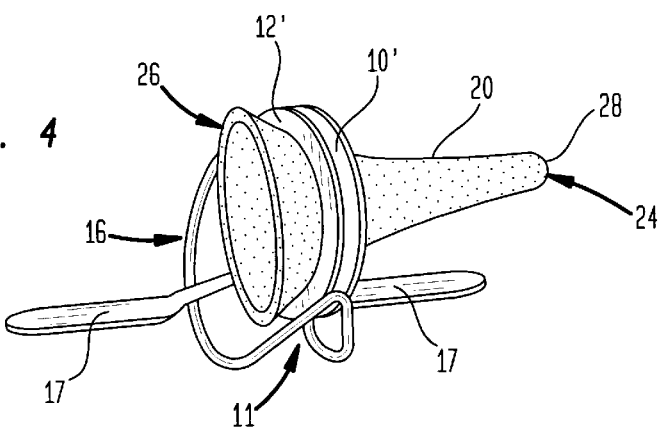

The enhanced and improved elognated guide member 20 of the novel invention is shown in FIGS. 2, 3 and 4. It is dissimilar to the line guide 12 and guide ring 10 as described in connection with the prior art as shown in FIG. 1 in that the cross-section of the novel and improved guide is a very specific trumpet shaped or cone shaped tubular structure having a first aperture 22 and a second aperture 24 wherein the first aperture 22 is substantially larger than the second aperture 24 and the two apertures are spatially parallel and spaced substantially apart according to a specific aspect ratio.

There is shown in FIG. 3 a perspective view or representation of the preferred embodiment of a ceramic or stainless steel guide ring for enhancing the outflow of a fishing line from a fishing reel, namely, a trumpet-shaped guide made entirely of either a ceramic such as aluminum oxide or polished chrome alloyed stainless steel. The aluminum oxide may be selected from the group of various compositions of alumina as specified in U.S. Pat. No. 4,011,680 which issued to Rienzo Sr. on Mar. 15, 1977 but adapted with a highly polished interior surface 25 for the interior chamber of the guide member 20.

FIG. 4 shows a perspective view of the novel line guide member 20 inserted into at least one frame assembly: For example, a ring frame 16 of the generic type shown in FIG. 1 wherein plastic or metal is substituted for the ceramic ring insert may be utilized to mount the guide member 20. The ring frame 16 is adapted to be attached or saddled to a diameter aspect of the guide member 20. If desired, a second smaller diameter ring frame (not shown) may be adapted and attached or saddled to a smaller diameter aspect of the guide member 20, distally farther away from the angler. The ring frame 16 is further adapted with a set of two mounting feet 17, for example, for attachment of the frame 16 to a fishing rod (not shown).

The ring frame 16 has a receiving ring 10', made of metal or plastic, for example, and surrounded by a second receiving member 12', also made of a metal or plastic selected to be epoxied to ceramic. The receiving ring 10' and the second receiving member 12' may be made entirely of metal or plastic or made of both materials. The novel guide member 20 may also be secured to the receiving member 12' frictionally, especially where the receiving member 12' is made of a resilient plastic material or the guide member 20 is adapted with a mating groove to receive the contacting shape of the resilient member 12'.

Alternatively, the novel guide member 20 is secured to the larger ring frame 16 and the smaller ring frame using an epoxy, other chemical bonding material, or a frictional tongue-like resilient member 12' and groove for the guide member 20 assembly structure. Most importantly, any number of mechanical attachment means for attaching the ceramic guide member 20 to the receiving member 12' are readily available and known in the art.

Referring to FIG. 2, the criticality of the configuration of the novel and improved guide member 20 is specified. Note: The formula specified for the geometries expressed herein are for the internal configuration of the insert. Since the external shape has no effect on the function of the insert, it may be dissimilar.

In the following description, A is an acute angle; B is an acute angle; AB is the diameter of the aperture 22; and CD is the diameter of the aperture 24. EF represents the distance between the apertures 22 and 24. Line AB represents the inside diameter of the primary opening.

Line CD represents the inside diameter of the secondary opening.

Line EF represents overall length and the centerline axis which bisects both AB and CD.

The detailed specification for a preferred embodiment of the novel line guide member 20 as illustrated in FIG. 2 are as follows:

AB=0.50 inches, for example (or applicable industry standard dia. as related to rod length, reel size and line test)

EF=1.78×AB (linear distance in inches)

CD=0.28×AB (linear distance in inches)

ANGLE "A"=60 Degrees (or 330 degrees off the x-axis)

ANGLE "B"=60 Degrees (or 30 degrees off the x-axis)

ANGLE "C"=95 Degrees (or 175 degrees off the x-axis)

ANGLE "D"=95 Degrees (or 185 degrees off the x-axis)

The extension of angle "A" intersects with the extension of angle "C". This corner is adjusted or smoothed (filleted) at approximately a 2 inch radius. The same is done for extensions "B" and "C". This creates a smooth and gradual curve.

The edges of the apertures 22 and 24 are rounded such that a smooth lip 26 and a smooth lip 28, respectively, are formed as shown in FIGS. 2, 3, and 4.

One theory of the inventor addresses how this design substantially improves performance over the prior art and is presented herein as part of the specification. First, what happens when using a generic ring style line guide was analyzed. This explanation presumes one of ordinary skill understands the mode of operation of the typical open bail type spinning reel. When a cast is made, the monofilament line exits the reel in a relatively large diameter spiral pattern. When this configuration enters the first line guide, which is circular or more specifically in the shape of a ring, a violent phenomenon occurs: The spiral configuration is abruptly compressed to at least one-fifth its original size. The inertial energy of the monofilament line in this spiral configuration is suddenly interrupted and dispersed in directions substantially orthogonal to the flow direction of the line as well as the intended forward flow direction for the line. At that very point of impact at the entrance of the guide, the kinetic energy in the line and the momentum of the portion the line impacting the guide is converted to static frictional energy and thus the monofilament line partially directed outward and backward toward the reel. The novel guide of the invention substantially diminishes this effect as a result the novel combination of its shape and the material of which it is made.

When the line passes through the guide and begins its exit, yet another phenomenon occurs: The line spiral, which has been violently compressed, immediately attempts to recoil to its original size. This sequence is then repeated at each subsequent guide which is always smaller in diameter than the preceding guide. The build-up of the continuous conversions of kinetic or "adverse" energy to static or frictional energy from one guide to the next impedes the casting distance and the control of accuracy. Also, when the oversized line spiral finally leaves the end of the fishing rod, the increased sizing of the spiral in the line makes the line more susceptible to friction from wind and ambient air.

The novel guide addresses both phenomena described above. With its unique double-taper design combined with use of either chrome stainless steel or hard polished aluminum oxide, the spiral configuration is reduced gradually once as it enters the guide and again while it is still contained within the guide. A "venturi" effect is accomplished in the guide plenum wherein back-pressure at the first guide position is reduced compared with the operation of a prior art conventional guide. When the line exits the guide, its small spiral configuration is maintained since the compression was achieved gradually and smoothly. At all subsequent guides, the compression requirement is virtually eliminated; therefore, the novel guide is needed only at the first guide position from the reel. Also, the subsequent guides do not have to be of progressively smaller diameters. Upon casting, an unexpected and most unusual event occurs: The line smoothly exits the end of the fishing rod in a consistently small, substantially straightline configuration. The net result is that a fisherman obtains considerably more distance and accuracy than is achieved using the conventional guides of the prior art.

The invention is contemplated for large scale manufacture and availability and an OEM type item to be installed at the rod manufacturing level. Alternatively, the novel invention is contemplated as an after-market item to be purchased at retailers and installed at the consumer level.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A line guide mounted to a fishing rod for guiding a fishing line comprising:

a line guide having an inner ring and a cradle, an elongated guide member having a continuous internal chamber with a round entrance aperture and a round exit aperture, said guide member being generally trumpet-shaped, and said continuous internal chamber having a highly polished internal surface, whereby said guide member is inserted into said inner ring such that a diameter of said entrance aperture is larger than an internal diameter of said inner ring and a diameter of said exit aperture is smaller than an internal diameter of said inner ring, said guide member is retained in said inner ring and extends on both sides of the inner ring with the entrance aperture directed toward a butt end of a fishing rod and the exit aperture directed toward a tip end of a fishing rod.

* * * * *